US010646992B2

(12) United States Patent
Zwinderman et al.

(10) Patent No.: US 10,646,992 B2
(45) Date of Patent: May 12, 2020

(54) SYSTEM AND METHOD FOR PLACING AN OBJECT, WHICH IS TO BE PROCESSED, ON A PRODUCTION APPARATUS IN A PRECISE POSITION

(71) Applicant: Bayerische Motoren Werke Aktiengesellschaft, Munich (DE)

(72) Inventors: Remco Zwinderman, Freising (DE); Jan Hodde, Munich (DE); Stefan Josef Stanglmaier, Mainburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 230 days.

(21) Appl. No.: 15/498,799

(22) Filed: Apr. 27, 2017

(65) Prior Publication Data

US 2017/0252919 A1    Sep. 7, 2017

Related U.S. Application Data

(63) Continuation of application No. PCT/EP2015/073231, filed on Oct. 8, 2015.

(30) Foreign Application Priority Data

Oct. 28, 2014    (DE) .................. 10 2014 221 877

(51) Int. Cl.
*B62D 65/02*    (2006.01)
*B25J 9/16*    (2006.01)
(Continued)

(52) U.S. Cl.
CPC ............. *B25J 9/0096* (2013.01); *B23P 19/10* (2013.01); *B23Q 7/04* (2013.01); *B23Q 17/24* (2013.01);
(Continued)

(58) Field of Classification Search
CPC ....... B25J 9/0096; B25J 9/1697; B29C 51/12; B23P 19/10; B23P 2700/50; B23Q 7/04;
(Continued)

(56) References Cited

U.S. PATENT DOCUMENTS 6,043,621 A    3/2000    Neumann
6,167,607 B1 *    1/2001    Pryor .................. A01B 69/008
                                                    29/407.04
(Continued)

FOREIGN PATENT DOCUMENTS

CN    1216017 A    5/1999
CN    1534385 A    10/2004
(Continued)

OTHER PUBLICATIONS

International Search Report (PCT/ISA/210) issued in PCT Application No. PCT/EP2015/073231 dated Jan. 14, 2016 with English translation (seven pages).

(Continued)

*Primary Examiner* — David P Bryant
*Assistant Examiner* — Lawrence Averick
(74) *Attorney, Agent, or Firm* — Crowell & Moring LLP

(57) ABSTRACT

A system and method for placing an object, which is to be processed on a production apparatus in a precise position, is provided. The system includes at least one location-determining system for determining a relative location of an object in relation to a production apparatus and a positioning apparatus for positioning the object on the production apparatus. The positioning apparatus has a receiving apparatus for receiving and discharging the object, and a movable arm for moving the object from one location to another. The location-determining system has at least one location-detecting device to detect a relative location of the receiving apparatus in relation to the location-detecting device. The (Continued)

location-detecting device is configured to detect a relative location of the object in relation to the location-detecting device and also a relative location of the production apparatus in relation to the location-detecting device.

10 Claims, 1 Drawing Sheet

(51) Int. Cl.
*B23Q 17/24* (2006.01)
*B23P 19/10* (2006.01)
*B21D 43/00* (2006.01)
*B25J 9/00* (2006.01)
*G05B 19/418* (2006.01)
*B23Q 7/04* (2006.01)
*B29C 51/12* (2006.01)

(52) U.S. Cl.
CPC ............ *B25J 9/1697* (2013.01); *B29C 51/12* (2013.01); *B62D 65/028* (2013.01); *G05B 19/41815* (2013.01); *B21D 43/003* (2013.01); *B23P 2700/50* (2013.01); *Y02P 90/08* (2015.11); *Y02P 90/265* (2015.11)

(58) Field of Classification Search
CPC .................. B23Q 17/24; G05B 19/41815; B62D 65/028; Y02P 90/265; Y02P 90/08; B21D 43/003
See application file for complete search history.

(56) References Cited

U.S. PATENT DOCUMENTS

| | | |
|---|---|---|
| 2004/0227924 A1 | 11/2004 | Willems Van Dijk et al. |
| 2006/0137164 A1 | 6/2006 | Kraus |
| 2009/0112362 A1 | 4/2009 | Nishi et al. |
| 2010/0232923 A1 | 9/2010 | Doerner et al. |
| 2012/0239181 A1 | 9/2012 | Gu et al. |
| 2014/0277720 A1 | 9/2014 | Izumi et al. |
| 2015/0286211 A1 | 10/2015 | Sticht et al. |
| 2016/0059419 A1* | 3/2016 | Suzuki ................. B25J 9/1697 700/114 |

FOREIGN PATENT DOCUMENTS

| | | |
|---|---|---|
| CN | 101424935 A | 5/2009 |
| CN | 202943639 U | 5/2013 |
| CN | 104044152 A | 9/2014 |
| DE | 202 04 585 U1 | 4/2003 |
| DE | 102 42 710 A1 | 4/2004 |
| DE | 10 2008 018 848 A1 | 10/2009 |
| DE | 10 2009 021 483 B3 | 2/2011 |
| DE | 10 2012 203 600 A1 | 10/2012 |
| DE | 10 2011 117 984 B4 | 6/2013 |
| EP | 0 104 270 A1 | 4/1984 |
| EP | 2 190 604 B1 | 1/2011 |
| WO | WO 2014/071434 A1 | 5/2014 |

OTHER PUBLICATIONS

German-language Written Opinion (PCT/ISA/237) issued in PCT Application No. PCT/EP2015/073231 dated Jan. 14, 2016 (six pages).

German Search Report issued in counterpart German Application No. 10 2014 221 877.2 dated Jun. 11, 2015 with partial English translation (10 pages).

Chinese-language Office Action issued in counterpart Chinese Application No. 201580039811.5 dated Feb. 24, 2018 with English translation (14 pages).

\* cited by examiner

SYSTEM AND METHOD FOR PLACING AN OBJECT, WHICH IS TO BE PROCESSED, ON A PRODUCTION APPARATUS IN A PRECISE POSITION

CROSS REFERENCE TO RELATED APPLICATIONS

This application is a continuation of PCT International Application No. PCT/EP2015/073231, filed Oct. 8, 2015, which claims priority under 35 U.S.C. § 119 from German Patent Application No. 10 2014 221 877.2, filed Oct. 28, 2014, the entire disclosures of which are herein expressly incorporated by reference.

BACKGROUND AND SUMMARY OF THE INVENTION

The present invention relates to a system for placing an object, which is to be processed, on a production apparatus in a precise location by means of a location-determining system and a positioning apparatus. The invention further relates to a method for placing an object, which is to be processed, on a production apparatus in a precise location, which method can be executed on a system of this kind.

In automated production and assembly systems, objects which are to be processed and which are arranged at a first location are received by positioning apparatuses and put down again at a second location. To this end, positioning apparatuses have a receiving apparatus for receiving and delivering the object which is to be processed. When the object which is to be processed is put down at the second location, it is necessary to position the object, which is to be processed, as exactly as possible in order to ensure as high a degree of process reliability and, respectively, reliability of a subsequent production and/or assembly process as possible. In the case of automated production and assembly systems, incorrect positioning of an object which is to be processed can lead to faulty products and also, in extreme cases, to stoppage of the production and/or assembly system.

Automated production and assembly systems of this kind are used in the automobile industry in particular. When producing fiber-reinforced components, such as shell components for example, objects which are to be processed are reinforced with reinforcing fibers for increasing strength and also rigidity. Objects of this kind are often designed as plastic components and are therefore called fiber-reinforced plastics. Fiber-reinforced plastics have reinforcing fibers which are embedded in a plastic matrix. Since intended mechanical loading is often distributed in an inhomogeneous manner over the component, the component has, to reduce the total weight, a fiber reinforcement formed depending on the mechanical loading. Fiber-reinforced components of this kind therefore have fiber reinforcements which can be formed differently over the respective component, so that some points of the component have, for example, a stronger fiber reinforcement or a fiber reinforcement with a different orientation of the reinforcing fibers than other points.

Pressing tools which have pockets for accommodating the reinforcing fibers are used to manufacture components with locally formed fiber reinforcements. Since fiber-reinforced plastics have a particularly high load-bearing capacity when the reinforcing fibers are oriented in the direction of the flow of force, precise orientation of the reinforcing fibers in relation to the component, in addition to precise positioning of the reinforcing fibers at the location on the component which is to be reinforced, is of great importance in order to achieve reinforcement of a component in as efficient a manner as possible. Imprecise or incorrect positioning of the reinforcing fibers in the pressing tool can lead to local excessive pressing of the component and therefore damage the component. Imprecise or incorrect orientation of the reinforcing fibers in the pressing tool can result in the reinforcing fibers not being oriented in an optimum manner in relation to the flow of force and therefore not developing an adequate reinforcing action of the component, with the result that it may not be possible to use the component as intended. For this reason, production and assembly systems of this kind have particular requirements in respect of the reliability of a system for placing a component, such as a fiber-reinforced plastic for example, on a production apparatus in a precise location.

A system for placing an object, which is to be processed, on a production apparatus is known, where it is possible for the object which is to be processed to be arranged on a receiving apparatus of a positioning apparatus. The system has an optical recognition system for ascertaining a relative position of the object, which is to be processed, in relation to the positioning apparatus. Furthermore, the system contains location data for an ideal relative location of the production apparatus in relation to the system. A system of this kind has the disadvantage that an incorrect location of the production apparatus cannot be recognized by the system and can lead to faulty products. Therefore, the production apparatus has to be arranged relative to the system subject to very low tolerances. This process is very time-consuming and leads to excessively long stoppage of the production system and also to a resulting increase in manufacturing costs.

The object of the present invention is therefore to at least partially eliminate the above-described disadvantages in a system for placing an object, which is to be processed, on a production apparatus in a precise location. A particular object of the present invention is to provide a system for placing an object, which is to be processed, on a production apparatus in a precise location, which system allows an object, which is to be processed, to be placed on a production apparatus with positional accuracy, without complex orientation of the production apparatus. A further object of the present invention is to provide a method for placing an object, which is to be processed, on a production apparatus in a precise location, which method does not have at least some of the above-discussed disadvantages.

This and other objects are achieved in accordance with embodiments of the invention. It is an object according to the invention to provide a system and also a method for placing an object, which is to be processed on a production apparatus in a precise location. Further features and details of the invention can be gathered from claims, the description and the drawings. It goes without saying that features and details which are described in connection with the apparatus also apply in connection with the method according to the invention and vice versa in each case, so that reciprocal reference is always made or can always be made in respect of disclosure pertaining to the individual aspects of the invention.

According to the first aspect of the invention, the problem is solved by a system for placing an object, which is to be processed on a production apparatus in a precise location, having at least one location-determining system for determining a relative location of an object, which is to be processed, in relation to a production apparatus, and a positioning apparatus for positioning the object, which is to be processed, on the production apparatus. The positioning apparatus has a receiving apparatus for receiving and discharging the object which is to be processed, and has a movable arm for moving the object, which is to be processed, from a first location to a second location. The location-determining system has at least one location-detecting device which is configured to detect a relative location of the receiving apparatus in relation to the location-detecting device. Furthermore, the location-detecting device is further configured to detect a relative location of the object, which is to be processed, in relation to the location-detecting device and also a relative location of the production apparatus in relation to the location-detecting device.

Within the meaning of the invention, a location of an object which is to be processed is intended to be understood to mean a position and an orientation of the object which is to be processed. Therefore, all of the degrees of freedom of a body in a three-dimensional space are determined by the location.

The objects which are to be processed are preferably locally fiber-reinforced semi-finished products which are also called tailored blanks. The objects which are to be processed are preferably substantially formed from a plastic and have reinforcement fibers.

Within the meaning of the invention, a production apparatus is part of a production facility on which an object, which is to be processed, can be arranged for processing purposes. A production apparatus can be designed, for example, as a clamping apparatus, such as a clamping table for example, or part of a molding die which has, for example, local raised areas and/or recesses. Within the meaning of the invention, arrangement at the production apparatus can also be understood to mean arrangement in or on the production apparatus and is therefore not intended to be understood as a restriction within the meaning of "next to the production apparatus."

A location-determining system has at least one location-detecting device by means of which the location of an object within an operation area of the location-determining system relative to the location-detecting device can be detected. Since a location of the location-detecting device within the operation area of the location-determining system is known, the location of the object relative to each reference point within the operation area and therefore also relative to the production apparatus can therefore be determined.

A positioning apparatus is an apparatus by means of which an object, which is to be processed, can be received at a first location and can be set down again at a second location.

In this case, the positioning apparatus is designed to set down the object, which is to be processed, with locational (or positional) accuracy, that is to say at a pre-specified position and also with a pre-specified orientation. The positioning apparatus is coupled to the location-detecting system, so that acquired location information relating to the object, which is to be processed, and the production apparatus can be used by the positioning apparatus to set down the object, which is to be processed, on the production apparatus in a precise location.

A system of this kind has the advantage that, owing to detection of the location of the production apparatus by the location-detecting device, it is no longer necessary to exactly orient the production apparatus in relation to the location-determining system or in relation to the positioning apparatus since any deviation in the location of the production apparatus from a desired location can be detected by the location-determining system and therefore can be compensated for by corresponding actuation of the positioning apparatus. In this way, stoppage times, for example, for a new facility or servicing of the production facility, can be considerably reduced and therefore production costs can be considerably lowered. Furthermore, the system according to the invention allows for a significant increase in process reliability since all of the locations which are relevant for production can be determined during production and are therefore available live. Deviations, such as rotation of the semi-finished product for example, can therefore be immediately recognized and compensated for, without having to stop production for this purpose.

According to a preferred further development of the invention, the location-determining system has at least one first reference marking and at least one second reference marking, wherein the first reference marking can be arranged at the receiving apparatus and the second reference marking can be arranged at the production apparatus. In this case, the location-determining system is configured to determine a relative location of the first reference marking and of the second reference marking in relation to the location-detecting device. Here, it is necessary to determine a location of the first reference marking in relation to the receiving apparatus and also a location of the second reference marking in relation to the production apparatus, so that it is possible to draw conclusions about the locations of the receiving apparatus and also of the production apparatus by means of determined locations of the reference markings. Reference markings of this kind have the advantage that a location of the receiving apparatus and also of the production apparatus can be easily detected by the location-determining device. The reliability of the system is further increased in this way.

The location-determining system is preferably further configured to determine a relative location of the object, which is to be processed, in relation to the first reference marking. Within the meaning of the invention, it does not matter whether this takes place by determining a location of the object, which is to be processed, relative to the first reference marking or relative to the receiving apparatus since a relative location of the first reference marking in relation to the receiving apparatus is already determined. A system of this kind has the further advantage that the object, which is to be processed, does not have to be arranged or oriented exactly on the receiving apparatus since any deviations in location from a desired location can be detected by the location-detecting device and therefore can be compensated for by the positioning apparatus when the object, which is to be processed, is set down. The degree of process reliability is further increased and production costs are reduced in this way.

In an advantageous refinement of the invention, the location-detecting device has an optical location-detecting apparatus. Optical location-detecting apparatuses have, for example, a camera which is configured to detect objects, in particular reference markings. Preferred optical location-detecting apparatuses are configured to detect a contour of an object which is not designed as a special reference body. The location-determining system can determine the location of the object from this. Location-detecting apparatuses of this kind have the advantage that they are relatively cost-effective and allow the location of the object to be determined in a reliable manner when there is a clear view of at least subregions of an object.

The first reference marking and/or the second reference marking preferably have/has at least one spherical reference body. The reference marking further preferably has three reference bodies of this kind. Furthermore, it is preferred when the reference marking is of substantially flat design, in order to reduce the risk of damage to the reference bodies. Reference bodies of this kind have the advantage that they allow location data to be determined in a particularly precise manner by the location-detecting device and can be manufactured in a very cost-effective manner.

It is preferred that the positioning apparatus is in the form of a robot. Robots of this kind can be easily integrated into automated production and assembly systems, have a high degree of reliability and can contribute to increasing productivity. Positioning errors when setting down the object, which is to be processed on the production apparatus can be avoided by supplying the determined location data to a control unit of the robot. This has the advantage that the system has a high degree of process reliability.

The production apparatus further preferably has at least one pocket and/or raised area for receiving a subregion of the object which is to be processed. Pockets and/or raised areas can have both edges and rounded portions within the meaning of the invention. The pockets and/or raised areas preferably have at least one interlocking section which facilitates arrangement of the object, which is to be processed, at the production apparatus. This has the advantage that the degree of process reliability of the system is further improved. Furthermore, pockets have the advantage that, in the case of objects which are to be processed and are arranged at pressing tools, the subregions which are arranged in the pockets are subjected to a lower level of mechanical loading during the pressing process than if they were not arranged in pockets. Therefore, it is possible to prevent the object, which is to be processed, from being excessively loaded in local regions during the pressing process. This has the advantage that the degree of process reliability is further improved.

The production apparatus is particularly preferably in the form of a pressing tool. Tools of this kind are suitable for molding objects which are to be processed, such as tailored blanks for example, and which have a fiber reinforcement at least one point, to form a component and in the process strengthening a connection between a main body and the reinforcing fibers by pressure. Production apparatuses of this kind are therefore particularly suitable for processing tailored blanks in mass production.

Furthermore, the problem is solved, according to the invention, by a method for placing objects, which are to be processed on a production apparatus in a precise location. The method includes the acts of:

arranging an object, which is to be processed, on a receiving apparatus of a positioning apparatus;

determining a relative location of the object, which is to be processed, in relation to the receiving apparatus;

determining a relative location of the receiving apparatus in relation to a location-detecting device by means of the location-detecting device;

determining a relative location of a production apparatus in relation to the location-detecting device by means of the location-detecting device;

determining a relative location of the object, which is to be processed, in relation to the production apparatus; and setting down the object, which is to be processed, on the production apparatus in a precise location by means of the positioning apparatus.

This method has the advantage that complex orientation of the production apparatus relative to the positioning apparatus is no longer required since any deviation in the location of the production apparatus can be determined by the location-detecting system and therefore can be compensated for by the positioning apparatus when the object, which is to be processed, is set down on the production apparatus. The degree of process reliability and economic efficiency of the method are further improved in this way.

The relative location of the object, which is to be processed, in relation to the receiving apparatus is preferably determined by the location-detecting device. This has the advantage that complex orientation of the object, which is to be processed, on the receiving apparatus is no longer required since any deviation in the location of the object, which is to be processed, can be determined by the location-detecting system and therefore can be compensated for by the positioning apparatus when the object, which is to be processed, is set down on the production apparatus. The degree of process reliability and economic efficiency of the method are further improved in this way.

A system according to the invention for placing an object, which is to be processed on a production apparatus in a precise location will be explained in greater detail below with reference to drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
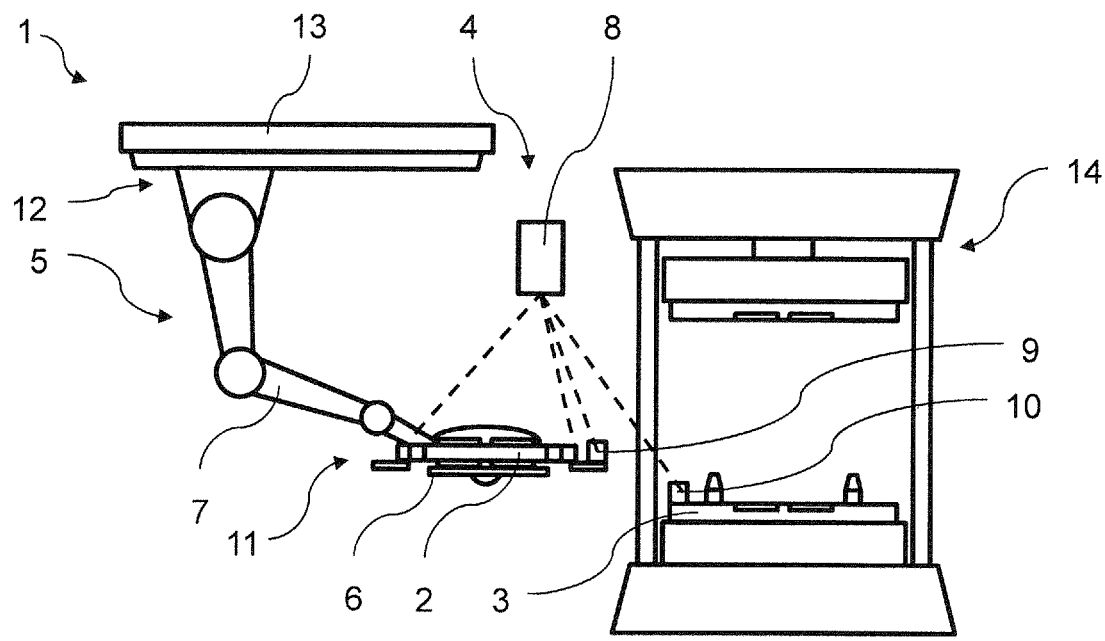
FIG. 1 is a schematic side view of a system according to the invention.

FIG. 1 schematically shows a side view of a system 1 according to the invention for placing an object 2, which is to be processed, on a production apparatus 3 in a precise location. The system 1 has a positioning apparatus 5 which is in the form of a robot with an arm 7 and a receiving apparatus 6 which is arranged at a lower end 11 of the arm 7. In this exemplary embodiment, the receiving apparatus 6 is in the form of a slotted flat gripper which is designed to grip the object 2 which is to be processed. The object 2, which is to be processed, is a semi-finished product which is in the form of a tailored blank.

The upper end 12 of the positioning apparatus 5 is arranged at a horizontally running rail 13, so that the positioning apparatus 5 can be moved horizontally along the rail 13. The rail 13 is arranged, for example, on a ceiling of a production hall or on a framework. In alternative embodiments, the rail 13 can also be arranged, for example, on the floor, on a wall or on a vehicle.

Furthermore, the system 1 for placing an object 2, which is to be processed, on a production apparatus 3 in a precise location has a location-determining system 4 including a location-detecting device 8, a first reference marking 9 and a second reference marking 10. The first reference marking 9 is arranged at the receiving apparatus 6, and the second reference marking 10 is arranged at the production apparatus 3. The location-detecting device 8 can be, e.g., an optical location-detecting device and designed to detect a relative location of the first reference marking 9, of the second reference marking 10 and also of the object 2, which is to be processed, relative to the location-detecting device 8. Regions which are detected by the location-detecting device 8 are symbolized as dashed lines in FIG. 1. In addition, the location-detecting device 8 can be designed to detect a large number of further regions.

In this exemplary embodiment, the production apparatus 3 is in the form of a lower part of a pressing tool of a press 14.

Figure 2:
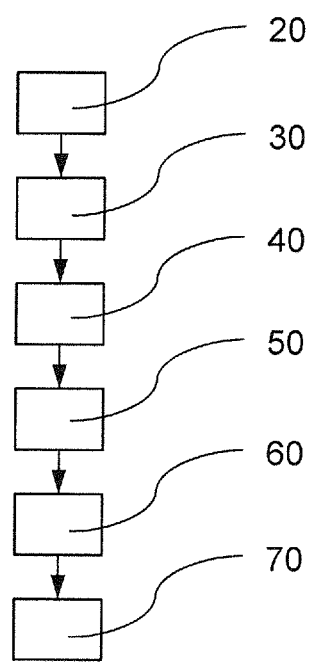
FIG. 2 is a flowchart of a method according to the invention.

FIG. 2 schematically shows a flowchart of the individual steps of the method according to the invention. In the first method step 20, an object 2, which is to be processed, is arranged at a receiving apparatus 6 of a positioning apparatus 5. In the second method step 30, a relative location of the object 2, which is to be processed, in relation to the receiving apparatus 6 is determined. This is done, for example, by means of a centering device which is arranged at the receiving apparatus 6. In the third method step 40, a relative location of the receiving apparatus 6 in relation to a location-detecting device 8 is determined by means of the location-detecting device 8. This is done, for example, by detecting a first reference marking 9 which is arranged at the receiving apparatus 6, for example using optical means. In the fourth method step 50, a relative location of a production apparatus 3 in relation to the location-detecting device 8 is determined by means of the location-detecting device 8. This is done, for example, by detecting a second reference marking 10 which is arranged at the production apparatus 3, for example using optical means. In the fifth method step 60, a relative location of the object 2, which is to be processed, in relation to the production apparatus 3 is determined. This is performed, for example, by a computer unit which compares the determined relative locations with one another and calculates the relative location of the object 2, which is to be processed, in relation to the production apparatus 3 from said comparison. In the sixth method step 70, the object 2, which is to be processed, is set down on the production apparatus 3 in a precise location by means of the positioning apparatus 5. The location data, which is required for this purpose, relating to the object 2, which is to be processed, and also to the production apparatus 3 is provided by the location-determining system 4.

A method of this kind has the advantage that a production apparatus 3 can be arranged relative to the positioning apparatus 5 within relatively large tolerances without having a negative influence on the degree of process reliability of the system 1 as a result. Production costs can be saved and positioning tolerances can be reduced in this way.

In a development of the method according to the invention, the relative location of the object 2, which is to be processed, in relation to the receiving apparatus 6 is ascertained by the location-detecting device 8. Precise orientation of the object 2 in relation to the receiving apparatus 6 is therefore possible within relatively large tolerances since the system 1 is designed to compensate for such tolerances. This has the advantage that the degree of process reliability is further increased and production costs are further lowered.

LIST OF REFERENCE SYMBOLS

1 System
2 Object which is to be processed
3 Production apparatus
4 Location-determining system
5 Positioning apparatus
6 Receiving apparatus
7 Arm
8 Location-detecting device
9 First reference marking
10 Second reference marking
11 Lower end
12 Upper end
13 Rail
14 Press
20 First method step
30 Second method step
40 Third method step
50 Fourth method step
60 Fifth method step
70 Sixth method step The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for placing an object, which is to be processed on a production apparatus in a precise location, comprising:
    at least one location-determining system to determine a relative location of an object, which is to be processed, in relation to a production apparatus; and
    a positioning apparatus to position the object on the production apparatus, where the positioning apparatus includes:
        a receiving apparatus to receive and discharge the object, and
        a movable arm to move the object from a first location to a second location,
    wherein the location-determining system has at least one location-detecting device configured to detect a relative location of the receiving apparatus in relation to the location-detecting device,
    wherein the location-detecting device is configured to detect a relative location of the object in relation to the location-detecting device, and
    wherein the location-detecting device is configured to detect a relative location of the production apparatus in relation to the location-detecting device.

2. The system according to claim 1,
    wherein the location-determining system has at least one first reference marking and at least one second reference marking,
    wherein the first reference marking is arranged at the receiving apparatus and the second reference marking is arranged at the production apparatus, and
    wherein the location-determining system is configured to determine a relative location of the first reference marking and the second reference marking in relation to the location-detecting device.

3. The system according to claim 2, wherein at least one of the first reference marking and the second reference marking has at least one spherical reference body.

4. The system according to claim 2, wherein the location-determining system is configured to determine a relative location of the object, which is to be processed, in relation to the first reference marking.

5. The system according to claim 4, wherein the location-detecting device has an optical location-detecting apparatus.

6. The system according to claim 5, wherein at least one of the first reference marking and the second reference marking has at least one spherical reference body.

7. The system according to claim 1, wherein the location-detecting device has an optical location-detecting apparatus.

8. The system according to claim 1, wherein the positioning apparatus is in the form of a robot.

9. The system according to claim 1, wherein the production apparatus has at least one pocket or at least one raised area for receiving a subregion of the object which is to be processed.

10. The system according to claim 1, wherein the production apparatus is in the form of a pressing tool.

* * * * *